United States Patent
May et al.

(10) Patent No.: US 11,044,518 B2
(45) Date of Patent: Jun. 22, 2021

(54) VIDEO ACCESS MASTER PLATFORM

(71) Applicant: AT&T Mobility II LLC, Atlanta, GA (US)

(72) Inventors: Ryan May, Maumelle, AR (US); Jonathan Levesque, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/926,401

(22) Filed: Mar. 20, 2018

(65) Prior Publication Data

US 2019/0297378 A1   Sep. 26, 2019

(51) Int. Cl.

| | |
|---|---|
| H04N 21/254 | (2011.01) |
| H04N 21/258 | (2011.01) |
| H04N 21/41 | (2011.01) |
| H04N 21/418 | (2011.01) |
| H04N 21/475 | (2011.01) |
| H04N 21/422 | (2011.01) |
| H04N 21/431 | (2011.01) |
| H04N 21/435 | (2011.01) |

(Continued)

(52) U.S. Cl.
CPC ..... *H04N 21/4353* (2013.01); *H04N 21/4532* (2013.01); *H04N 21/47202* (2013.01)

(58) Field of Classification Search
None
See application file for complete search history.

(56) References Cited

U.S. PATENT DOCUMENTS

| | | |
|---|---|---|
| 6,363,434 B1 | 3/2002 | Eytchison |
| 6,449,767 B1 | 9/2002 | Krapf et al. |
| 6,600,503 B2 | 7/2003 | Lawson et al. |

(Continued)

FOREIGN PATENT DOCUMENTS

| | | |
|---|---|---|
| WO | 9935849 A1 | 7/1999 |
| WO | 01/35658 | 5/2001 |

(Continued)

OTHER PUBLICATIONS

Comcast Technology Solutions, "Over-The-Top Video on Demand", Jan. 2017, 2 pages.

(Continued)

*Primary Examiner* — Brian T Pendleton
*Assistant Examiner* — Jean D Saint Cyr
(74) *Attorney, Agent, or Firm* — Guntin & Gust, PLC; Dana B. LeMoine (57) ABSTRACT

Aspects of the subject disclosure may include, for example, a machine-readable storage medium, including executable instructions that, when executed by a processing system including a processor, facilitate performance of operations that include receiving a request for a video-on-demand session through a selected video-application provided at a media processor, instantiating an instance of the selected video-application as an instantiated video-application, wherein the instantiated video-application loads a decryption algorithm for the video-on-demand session, receiving video data from a video service associated with the instantiated video-application, applying the decryption algorithm on the video data to generate decoded video content, and providing the decoded video content to the media processor. Other embodiments are disclosed.

20 Claims, 8 Drawing Sheets

(51) Int. Cl.
*H04N 21/45* (2011.01)
*H04N 21/472* (2011.01)

(56) References Cited

U.S. PATENT DOCUMENTS

| | | | |
|---|---|---|---|
| 7,468,684 | B2 | 12/2008 | Chiu et al. |
| 7,908,628 | B2 | 3/2011 | Swart et al. |
| 8,191,098 | B2 | 5/2012 | Cooper et al. |
| 8,799,957 | B2 | 8/2014 | Kunisetty et al. |
| 9,055,317 | B2 | 6/2015 | Cho et al. |
| 9,066,151 | B2 | 6/2015 | Roberts et al. |
| 9,210,361 | B2 | 12/2015 | Todd |
| 9,344,471 | B2 | 5/2016 | Lee |
| 9,591,361 | B2 | 3/2017 | Nagaraj et al. |
| 9,740,766 | B2 | 8/2017 | Arana |
| 9,854,309 | B2 | 12/2017 | Odryna et al. |
| 2002/0069416 | A1 | 6/2002 | Stiles et al. |
| 2006/0075433 | A1 | 4/2006 | Gardes et al. |
| 2007/0011604 | A1 | 1/2007 | Chiu et al. |
| 2008/0069203 | A1* | 3/2008 | Karczewicz ......... G06T 3/4007 375/240.01 |
| 2012/0198530 | A1* | 8/2012 | Bodavula ............ G06F 21/606 726/6 |
| 2013/0332839 | A1* | 12/2013 | Frazier ............... H04N 21/4668 715/738 |
| 2014/0282851 | A1 | 9/2014 | Miller et al. |
| 2014/0331245 | A1* | 11/2014 | Markley .......... H04N 21/44245 725/16 |
| 2016/0012048 | A1* | 1/2016 | Yellin ................ H04N 21/4858 707/722 |
| 2016/0066009 | A1* | 3/2016 | Rothschild ............. G11B 27/10 725/5 |
| 2016/0099995 | A1 | 4/2016 | LeCroy et al. |
| 2016/0203298 | A1* | 7/2016 | McCoskey ......... H04N 21/4668 726/30 |
| 2017/0055040 | A1* | 2/2017 | Volkman ............ H04N 21/4314 |
| 2019/0012048 | A1* | 1/2019 | Johnston ............... G06F 16/743 |
| 2019/0272358 | A1* | 9/2019 | McCoskey ....... H04N 21/25808 |

FOREIGN PATENT DOCUMENTS

| | | |
|---|---|---|
| WO | 0201454 A2 | 3/2002 |
| WO | 2006116368 A2 | 11/2002 |
| WO | 2008076905 A4 | 9/2008 |

OTHER PUBLICATIONS

Ericsson, "Azuki Systems: Over-The-Top (OTT) Optimized. Multi-Screen Video Delivery for Service Providers", White Paper; ericsson.com, May 2014, 6 pages.

Erman, Jeffrey et al., "Over the Top Video: The Gorilla in Cellular Networks", Proceedings of the 2011 ACM SIGCOMM Conference on Internet Measurement Conference, 2011, pp. 127-136.

Zype, "Quickly Import and Organize Content", zype.com, Feb. 7, 2018, 7 pages.

\* cited by examiner

VIDEO ACCESS MASTER PLATFORM

FIELD OF THE DISCLOSURE

The subject disclosure relates to a video access master platform across a plurality of media service providers.

BACKGROUND

Individual service providers conventionally provide media content via a media player provided and operated on an application executed on user equipment while others provide media content through a web browser or through a set-top box. These applications are executed locally and receive video data from the video service provider to provide a media content viewing session. These conventional applications, browsers, and set-top boxes do not share compatibility between their respective media players.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for providing a universal interface for a variety of video services at a media processor or other computing device or set-top box. Exemplarily, virtual machines can be instantiated to convert the content into a compatible format for a requesting device to allow the user to view the content with no additional effort required on their part. Exemplary embodiments provide features which removes additional burdens of troubleshooting or cost away from the user because exemplary embodiments of a video access media platform can be provided that allow users to stream media content onto media and computing devices that would not otherwise be able to present the media content. Other embodiments are described in the subject disclosure.

One or more aspects of the subject disclosure include method including receiving, by a processing system including a processor, a request for a video-on-demand session through a selected video-application from a media processor, determining, by the processing system, whether the media processor can perform the video-on-demand session, instantiating, by the processing system, an instance of the selected video-application as an instantiated video-application, wherein the instantiated video-application loads a decryption algorithm for the video-on-demand session, receiving, by the processing system, video data from a video service associated with the instantiated video-application, applying, by the processing system, the decryption algorithm on the video data to generate decoded video content, and providing, by the processing system, the decoded video content to the media processor.

One or more aspects of the subject disclosure include media processor that includes a processing system including a processor and a memory that stores executable instructions that, when executed by the processing system, facilitate performance of operations, including receiving a request for a video-on-demand session through a selected video-application, determining whether the media processor can perform the video-on-demand session, providing a request to a server responsive to determining that the media processor cannot perform the video on demand session, wherein the server instantiates an instance of the selected video-application as an instantiated video-application, wherein the instantiated video-application loads a decryption algorithm for the video-on-demand session, wherein the server receives video data from a video service associated with the instantiated video-application, and wherein the server applies the decryption algorithm on the video data to generate decoded video content, receiving the decoded video content from the server, and providing the decoded video content to a display.

One or more aspects of the subject disclosure include a machine-readable storage medium, comprising executable instructions that, when executed by a processing system including a processor, facilitate performance of operations that include receiving a request for a video-on-demand session through a selected video-application provided at a media processor, instantiating an instance of the selected video-application as an instantiated video-application, wherein the instantiated video-application loads a decryption algorithm for the video-on-demand session, receiving video data from a video service associated with the instantiated video-application, applying the decryption algorithm on the video data to generate decoded video content, and providing the decoded video content to the media processor.

Figure 1:
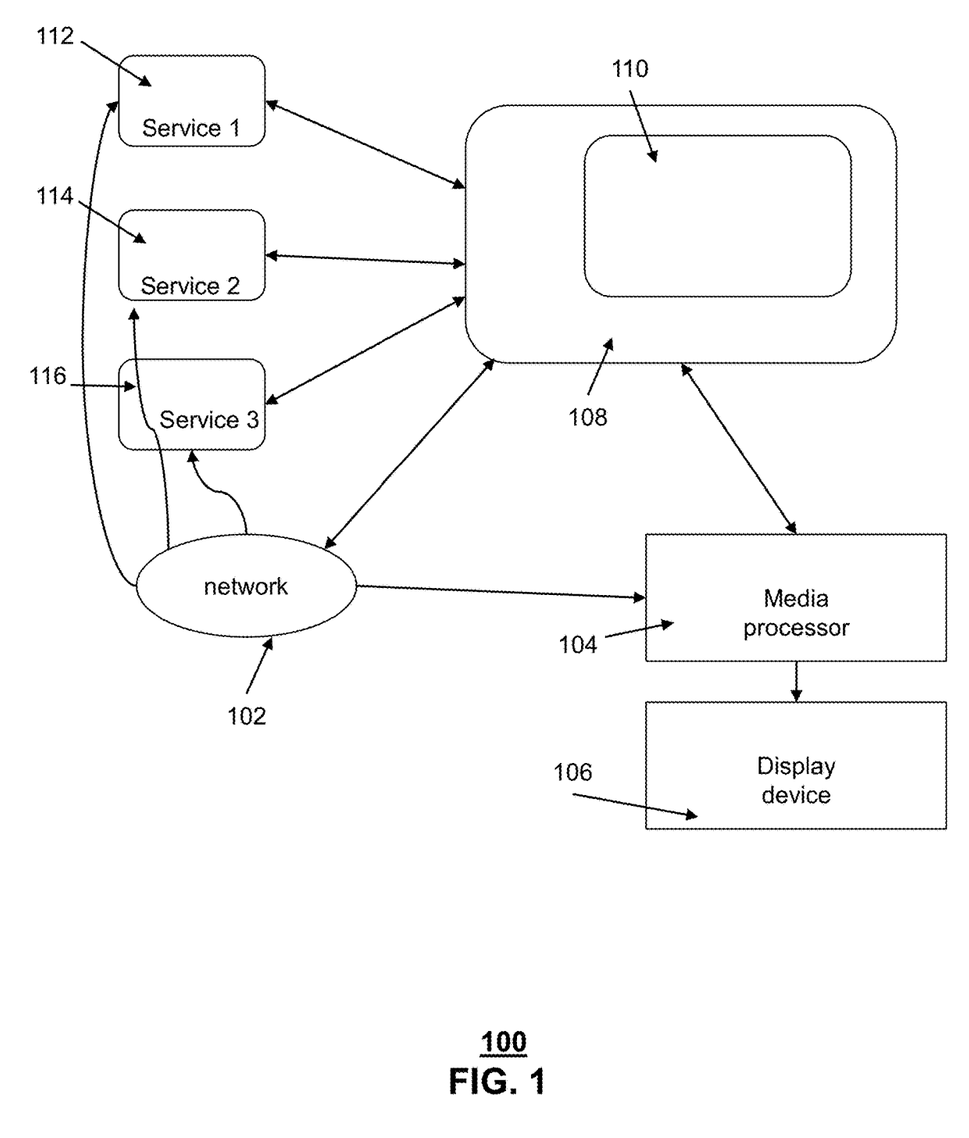
FIG. 1 depicts an illustrative embodiment of system 100.

FIG. 1 provides an illustrative embodiment of system 100. System 100 exemplarily provides video services from various video services 112, 114, and 116 to media processor 104. One or more of the exemplary embodiments may provide a video access application 108 which presents a singular entryway to media content from the video services 112, 114, and 116 through a user interface 110 presented on a display device 106 associated with the media processor 104. Exemplarily, the user interface 110 can provide the user with access to all of the video on demand services available to the user. The user may be subscribed to several video services including over-the-top (OTT) services, video on demand (VoD) services, and other streaming services. Exemplarily, these video services may each require their own application to access the video content offered by that video service.

Exemplarily, the video access application 108 provides a single location on a media device, such as a computer, media processor, smart phone, or set-top box, to engage with various media streaming services and applications such as Netflix™, Hulu™, Youtube™, Spotify™, Crackle™, etc. In some embodiments, the video access application 108 can provide users with the capability to log-in, search through, and play their selected media content on a single video screen without having to engage each application individually.

Exemplarily, the video access application 108 can store access information for each video service available to the user. In some examples, the video access application 108 can store log-in credentials including a user name and password for a video service. In other embodiments, the video access application 108 can store account information for other video services, such as a VoD catalog associated with a broadcast service provider. Exemplarily, by simply selecting video content from among a variety of menus and search options, the video access application 108 can provide the appropriate credentials to the appropriate video service to begin accessing the media content.

In some embodiments, the user interface 110 can provide a single access point for each of the video services available to the user without requiring access to the respective video service application for that video service. The user is thereby presented with a single user interface 110 through which all of the video content from the available video services may be accessed and viewed. Exemplarily, the video access application 108 can provide a listing of all the available video services and receive a selection of a video service from a user input. In some embodiments, user log-in data, passwords, and account information can be stored locally at the media processor 104 or at a server associated with the video access application 108.

In other embodiments, the video access application 108 can provide a searchable menu of available video content from each of the video services. In additional embodiments, the video access application 108 can provide a modified search menu through which the user can select media content from among all of the video services. Exemplarily, the video access application 108 can access available search features of each of the video services.

Figure 2:
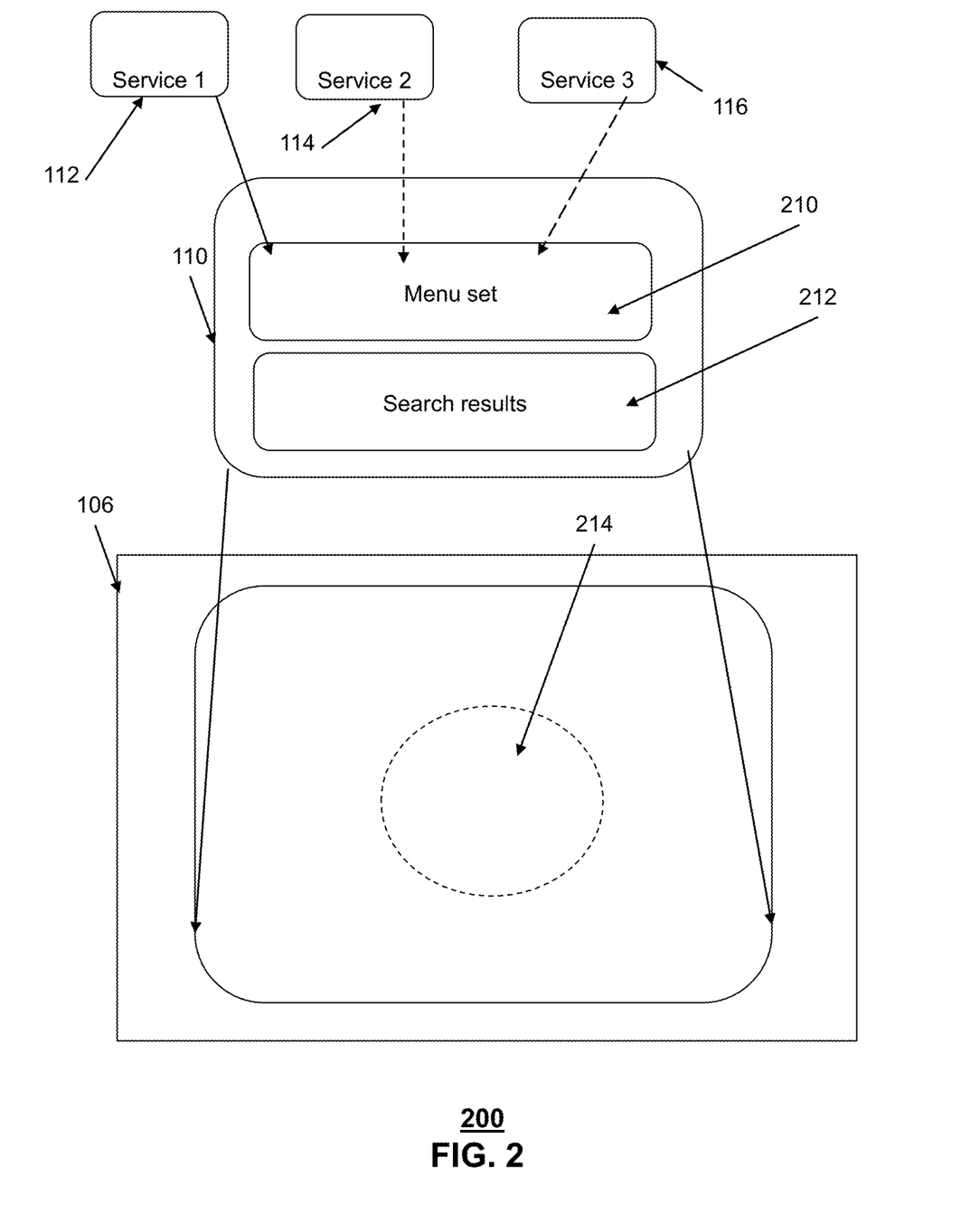
FIG. 2 depicts an illustrative embodiment of interface 200 of system 100.

FIG. 2 illustrates an exemplary embodiment of system 200 in which a singular search interface 200 can be provided through the video access application 108 of FIG. 1. In some embodiments, the video access application 108 can stay logged-in to each video application while a media processor 104 is using the video access application 108. Exemplarily, by maintaining a logged-in state, the video access application 108 can have access to search features and content menus for one or more of the video services. Exemplarily, the video access application 108 can provide a singular search interface 200 on display 106 to find media content and other content without particular emphasis on one or more of the video services. In some embodiments, all movies can be accumulated into one search feature 212 or menus 210 through the search interface 200. In another example, all media content associated with one or more actors can likewise be accumulated and presented in a search feature or menu. In yet another option, menus can be provided that distinguish between free video content, video content that can be rented, and video content that can only be purchased.

Exemplarily, the search features available through the video access application 108 can be easily manipulated by a user through the user interface 110. In some examples, the search features or menus can be limited to certain video services, audio services, and electronic book services. In other examples, the user may limit results to televisions, streaming web series, movies, or other divisions of media content. Exemplarily, video content 214 can likewise be displayed in the singular search interface either alone or overlaid with one of the search feature 212 or menus 210 as controlled by the user.

Returning to FIG. 1, the various video services 112, 114, and 116 and the video access application 108 can exemplarily be connected or located in various servers and communicate via a network 102. In some embodiments, the various video services 112, 114, and 116 can communicate via the network 102 with the video access application directly or through intermediary servers associated with the network 102. Exemplarily, the video services 112, 114, and 116 provide video data, and other media content data, to the media processor and/or the video access application 108 through the network, a broadcast system, a satellite service provider system, as well through other Internet and network connections.

In some embodiments, the video access application 108 can be provided in a server apart from the media processor 104 so that the video access application 108 is performed remotely but appears as being performed by the media processor 104 to the user. In additional embodiments, the video access application 108 can be provided at the media processor 104. In some embodiments, exemplary video access applications 108 can determine whether the media processor 104 has the capability or appropriate software to support a video session. In some embodiments, responsive to determining that the media processor 104 cannot process the video session, a server based media player for the video session can be instantiated. Exemplarily, a video session that is provided by a server-side video player can be seamlessly provided to the video access application 108 and be provided to a display device as if the video session was being performed locally. When the video data is received and decoded by the server, the resulting playback data is provided to the media processor 104 to be presented locally.

Exemplarily, a server-side video player providing a video session can provide a seamless, unified control of playback features to the user through the video access application 108. In some examples, some or all commands received from a control device or remote control associated with a media processor 104 on which the video access application 108 is associated can be translated into the appropriate commands for a particular video session being performed. In some embodiments, a user can be presented with the ability to control the video session according to controls based on an application that the video session would typically be performed on. In other embodiments, a control user interface, such as a graphical user interface, can be based on user preference or according to a consumption history of the user. The media processor 104 can be a set-top box, a gaming device, a computing device, or other media player device.

Exemplarily, during a video session performed through the video access application 108, streaming video data can be stored or buffered. Exemplarily, the buffering can take place locally, at the media processor 104, and/or at a server associated with the video access application 108. Exemplarily, the video playback commands can rewind, fast-forward, pause, skip ahead, and/or skip back as required, potentially engaging the buffering as needed. During the video session, video data is exemplarily received from the video service and stored or played as needed by the video access application 108. Exemplarily, the playing of the video data may require use of an algorithm or other decryption method necessary to decode the video data.

Figure 3:
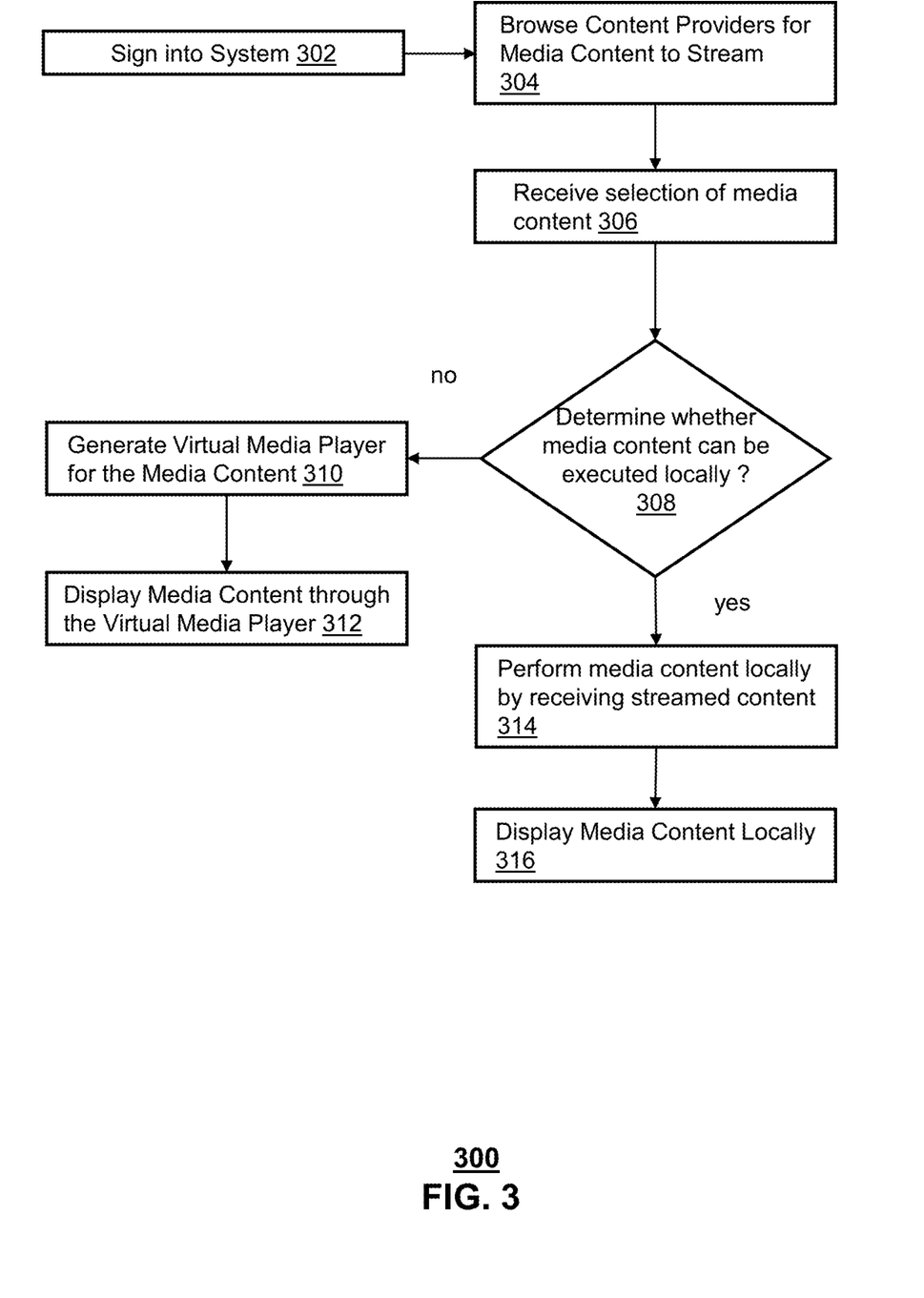
FIG. 3 depicts an illustrative embodiment of a method used in portions of the system described in FIG. 1.

FIG. 3 is an illustrative embodiment of a method 300 used by system 100. Exemplarily, in step 302, method 300 can begin when a user signs on into an exemplary video access application, such as video access application 108 of FIG. 1. In some embodiments, logging into the video access application 108 can load all of the user's passwords, log-in information, and account information for access to a variety of video services. In some embodiments, other content providers can likewise be accessed by the video access application 108.

Exemplarily, the video access application 108 can compose a variety of menus or present a variety of search options that can be provided to the user through an interface. Exemplarily, the menus and search options can be gathered from the search features and menus of the various service providers. In step 304, the various content providers, video service providers, and other service providers can be combed through and aggregated and presented in a menu format to the user through an interface. In step 306, a selection of one of the menu options can be received by the video access application 108. In other instances, a search feature can be engaged by the user and a search result returned. The user can then select or engage the video access application 108 to play or otherwise present the content through the video access application 108.

In some examples, the media content can be determined to be available from multiple sources. Exemplarily, the interface that provides the search results and other options can present an option for the user to select from which of the multiple sources to stream from. Exemplarily, the interface can provide information to the user for each content source, including price, quality, streaming rate, available supplemental features, promotional offers, and other relevant data from the multiple sources. In other embodiments, the search feature can automatically choose the best source for the content based on the features and/or the user's historical preferences.

Upon receiving the user input, in step 308 method 300 can determine whether the selected media content can be played locally on the media processor. In some instances, the media processor 104 may not have a video services application loaded thereon. In other instances, the media processor 104 may not have the proper decoder to play the media content. In instances in which the media processor 104 is determined to not be able to play the content locally, a virtual media player can be instantiated at a server location in step 310. In some embodiments, a physical server can be employed in the network 102 or a virtual server can be instantiated to provide the virtual media player.

In other instances, the user may select that the virtual player be used over the media processor 104 or the media processor may itself decide to outsource the media content to the virtual player. Exemplarily, the virtual media player has access to every one of the video services 112, 114, and 116 and their respective decoders, applications, and other software requirements. In addition, the virtual media player should likewise have access to the relevant log-in information for each of the video services 112, 114, and 116. Exemplarily, the virtual media processor provides the media content to be displayed locally at the display 106 associated with the media processor 104 in a seamless manner Exemplarily, the process of playing the media content at a virtual media player at a server location is performed without an indication to the user that the media is being decrypted remotely in step 312.

If, on the other hand, it is determined in step 308 to play the media content locally, in step 314, the media content is played by the software, applications, and decryption on the media processor. Similar to step 312 discussed above, the process of playing the media content locally is performed without an indication to the user that the media is being decrypted locally in step 316. In either instance, the user may observe the content and control the video access application 108 in a manner consistent with a normal viewing session as though being done directly with any one of the video services 112, 114, and 116. Accordingly, the user may engage the remote control or control apparatus to control the playback of the media content and to engage in various trick-play features.

Exemplarily, the control of the playback of the media content can be performed via a control process controlled by the video access application 108 in which all commands are translated to the specific inputs required for a current viewing session of media content. In other embodiments, the user can use the controls of the current application that is being accessed to provide the media content. In some examples, a user may prefer the controls layout for using Hulu™ while viewing a movie on Netflix™ and the video access application 108 can provide that interchangeability of commands. In other examples, the video access application 108 can simply provide one control method for all media services. Thus, in this example, a joystick controller for a gaming system can have a standardized button layout to control video playback features across all available media services that the user has access to.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
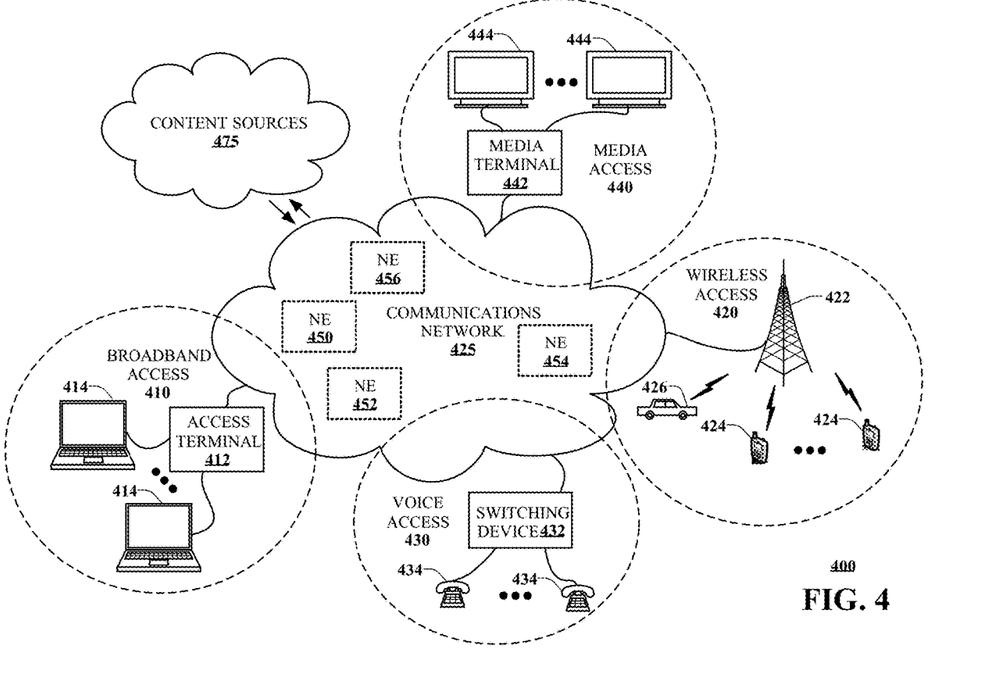
FIG. 4 is a block diagram illustrating an example, non-limiting embodiment of a communications network in accordance with various aspects described herein.

Referring now to FIG. 4, a block diagram is shown illustrating an example, non-limiting embodiment of a communications network 400 in accordance with various aspects described herein. For example, the network 400 can provide services between the devices illustrated in FIG. 1, such as network 102, service provider 112 and the media processor 104. In particular, a communications network 425 is presented for providing broadband access 410 to a plurality of data terminals 414 via access terminal 412, wireless access 420 to a plurality of mobile devices 424 and vehicle 426 via base station or access point 422, voice access 430 to a plurality of telephony devices 434, via switching device 432 and/or media access 440 to a plurality of audio/video display devices 444 via media terminal 442. In addition, communication network 425 is coupled to one or more content sources 475 of audio, video, graphics, text and/or other media. While broadband access 410, wireless access 420, voice access 430 and media access 440 are shown separately, one or more of these forms of access can be combined to provide multiple access services to a single client device (e.g., mobile devices 424 can receive media content via media terminal 442, data terminal 414 can be provided voice access via switching device 432, and so on).

The communications network 425 includes a plurality of network elements (NE) 450, 452, 454, 456, etc. for facilitating the broadband access 410, wireless access 420, voice access 430, media access 440 and/or the distribution of content from content sources 475. The communications network 425 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 412 can include a digital subscriber line access multiplexer (DSLAM), cable modem termination system (CMTS), optical line terminal (OLT) and/or other access terminal. The data terminals 414 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 422 can include a 4G, 5G, or higher generation base station, an access point that operates via an 802.11 standard such as 802.11n, 802.11ac or other wireless access terminal. The mobile devices 424 can include mobile phones, e-readers, tablets, phablets, wireless modems, and/or other mobile computing devices.

In various embodiments, the switching device 432 can include a private branch exchange or central office switch, a media services gateway, VoIP gateway or other gateway device and/or other switching device. The telephony devices 434 can include traditional telephones (with or without a terminal adapter), VoIP telephones and/or other telephony devices.

In various embodiments, the media terminal 442 can include a cable head-end or other TV head-end, a satellite receiver, gateway or other media terminal 442. The display devices 444 can include televisions with or without a set top box, personal computers and/or other display devices.

In various embodiments, the content sources 475 include broadcast television and radio sources, video on demand platforms and streaming video and audio services platforms, one or more content data networks, data servers, web servers and other content servers, and/or other sources of media.

In various embodiments, the communications network 425 can include wired, optical and/or wireless links and the network elements 450, 452, 454, 456, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 5:
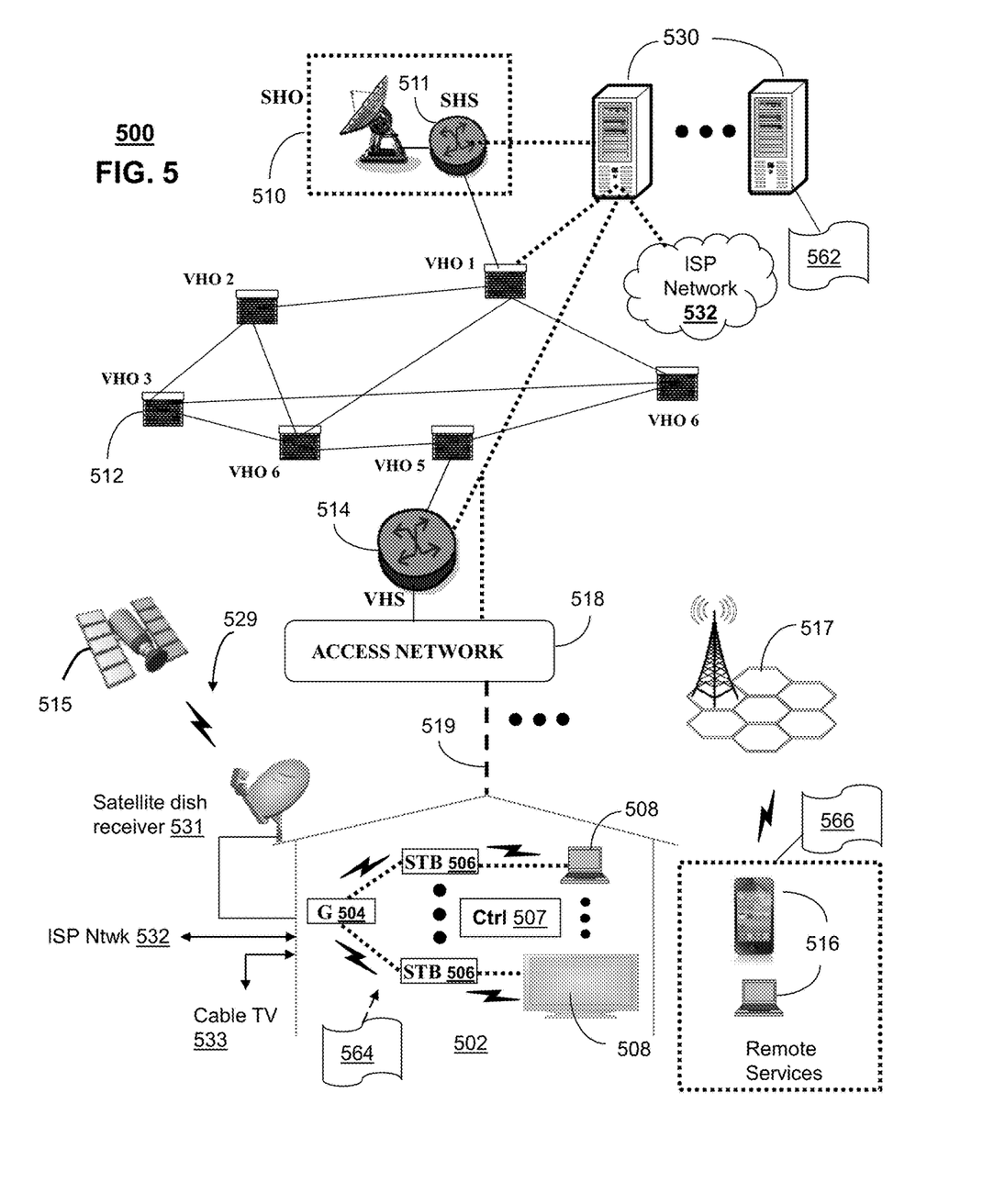
FIG. 5 depicts an illustrative embodiment of a web portal for interacting with the communication systems of systems 100 and 400 of FIGS. 1 and 4.

FIG. 5 depicts an illustrative embodiment of a communication system 500 for providing various communication services, such as delivering media content. The communication system 500 can represent an interactive media network, such as an interactive television system (e.g., an Internet Protocol Television (IPTV) media system). Communication system 500 can be overlaid or operably coupled with network architecture 100 of FIG. 1 as another representative embodiment of communication system 500. For instance, one or more devices illustrated in the communication system 500 of FIG. 5 can perform a method including receiving a request for a video-on-demand session through a selected video-application from a media processor, determining whether the media processor can perform the video-on-demand session, instantiating an instance of the selected video-application as an instantiated video-application, wherein the instantiated video-application loads a decryption algorithm for the video-on-demand session, receiving video data from a video service associated with the instantiated video-application, applying the decryption algorithm on the video data to generate decoded video content, and providing the decoded video content to the media processor.

In one or more embodiments, the communication system 500 can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol. The VHS 514 can distribute multimedia broadcast content via an access network 518 to commercial and/or residential buildings 502 housing a gateway 504 (such as a residential or commercial gateway).

The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite. The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a Virtual Media Player (herein referred to as a video access application 562). The Virtual Media Player 530 can use computing and communication technology to perform modifications of video delivery service, which can include among other things, the techniques of method 300 in FIG. 3. For instance, video access application 562 of computing devices 530 can be similar to the functions described for video delivery services as described in method 300 for, in one example, the video server 170 of FIG. 1. The media processors 506 and wireless communication devices 516 can be provisioned with software functions 564 and 566, respectively, to utilize the services of video access application 562. For instance, video presentation functions 564 and 566 of media processors 506 and wireless communication devices 516 can be similar to the functions described for the media processor 104 of FIG. 1 and method 300 of FIG. 3.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
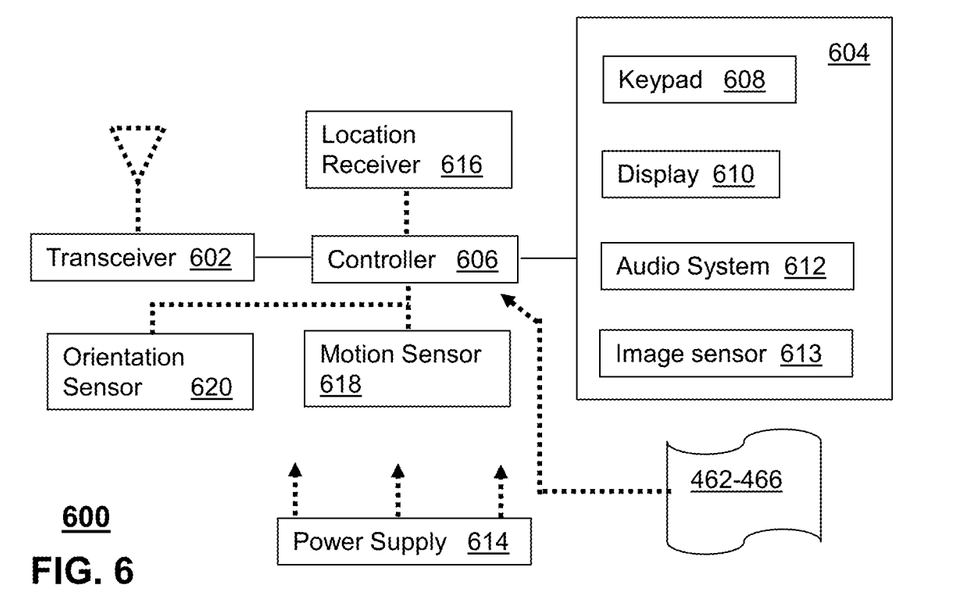
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIGS. 1 and 2, 4, and 5, and can be configured to perform portions of method 300 of FIG. 3. For example, the communication device can receive a request for a video-on-demand session through a selected video-application, determine whether the media processor can perform the video-on-demand session, and provide a request to a server responsive to determining that the media processor cannot perform the video on demand session.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of media processor 104 of FIG. 1, media terminal 442 of FIG. 4, the media processor 506, the media devices 508, or the portable communication devices 516 of FIG. 5. It will be appreciated that the communication device 600 can also represent other devices that can operate in system 100 of FIG. 1, communication system 500 of FIG. 5 such as a gaming console and a media player. In addition, the controller 606 can be adapted in various embodiments to perform the functions 562, 564, 566, respectively.

Upon reviewing the aforementioned embodiments, it would be evident to an artisan with ordinary skill in the art that said embodiments can be modified, reduced, or enhanced without departing from the scope of the claims described below. For example, audio services and e-books from various service providers and applications can likewise be accessed. In other embodiments, the video access application can exemplarily provide access to voice over Internet protocol and other Internet enable communications functionality. In further embodiments, directed advertising based on user profile information can likewise be provided during the use of the video access application. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
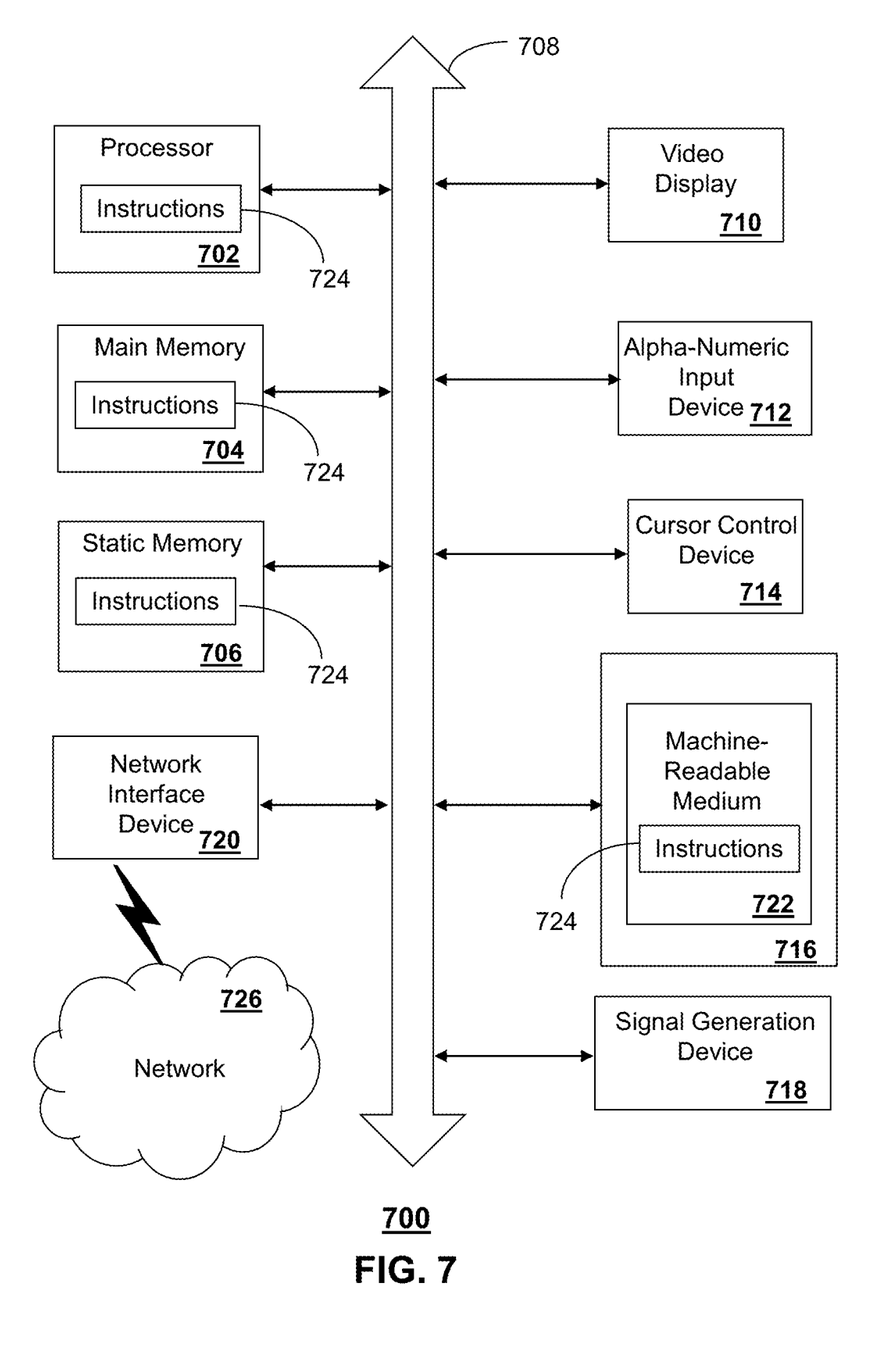
FIG. 7 is a diagrammatic representation of a machine in the form of a computer system within which a set of instructions, when executed, may cause the machine to perform any one or more of the methods described herein.
Figure 8:
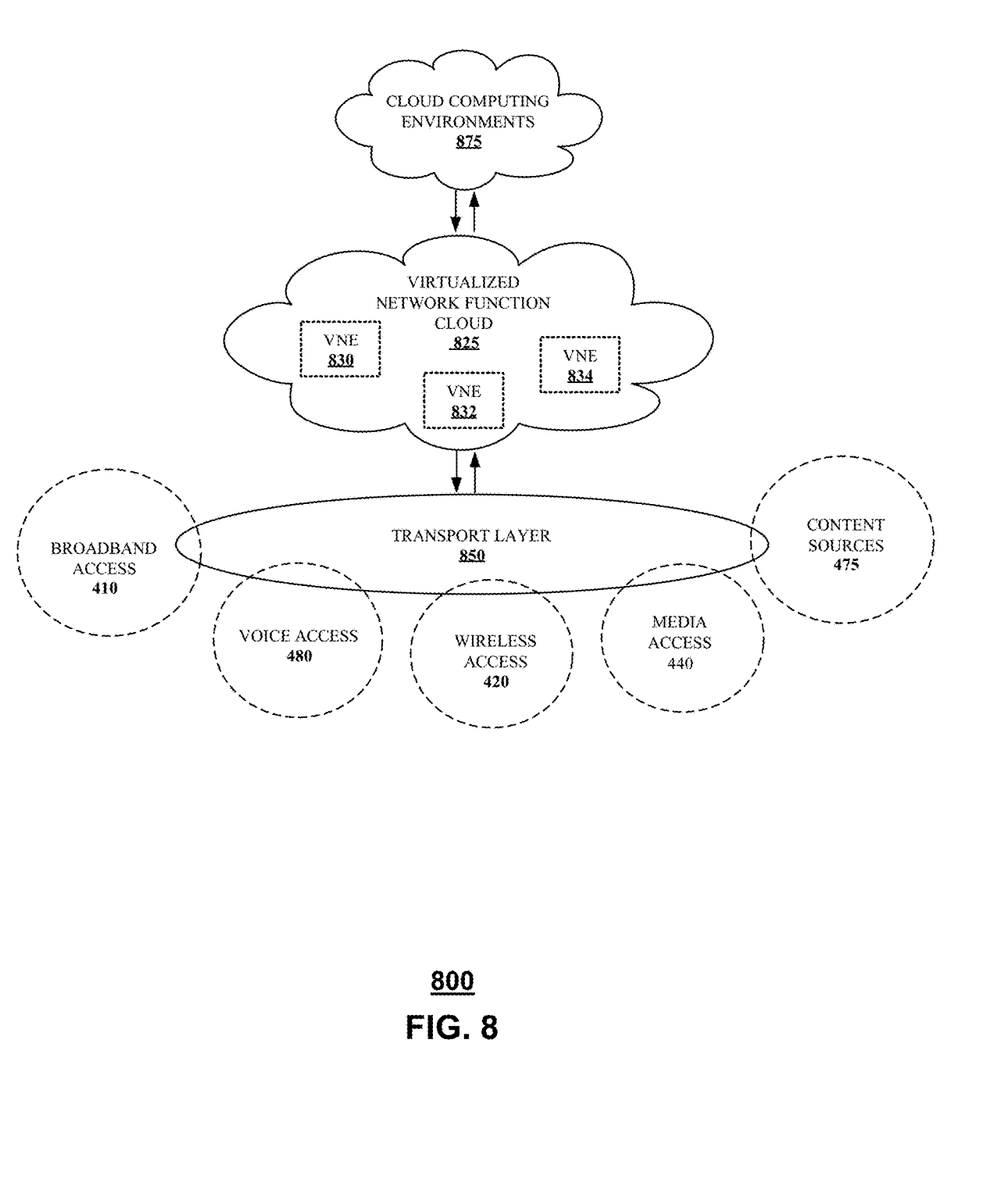
FIG. 8 is a block diagram illustrating an example, non-limiting embodiment of a virtualized communication network in accordance with various aspects described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the Virtual Media Player 530, the media processor 506, media processor 104, mobile devices 424, and the plurality of data terminals 414. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein.

Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
receiving from a media processor, by a processing system of a server remote from the media processor, the processing system comprising a processor, a request for a video session;
retrieving, by the processing system, a password and account information associated with accounts for a plurality of video service providers;
logging in, by the processing system, to the accounts for the plurality of video service providers;
gathering, by the processing system, menus from equipment of the plurality of video service providers, and providing the menus to the media processor;
receiving, by the processing system, a menu selection via a menu interface presented by the media processor, wherein the menu interface comprises the menus from the equipment of the plurality of video service providers;
gathering, by the processing system, search features from the equipment of the plurality of video service providers, and providing the search features to the media processor;
receiving, by the processing system, a search request via search interface presented by the media processor, wherein the search interface comprises the search features from the equipment of the plurality of video service providers;
selecting, by the processing system, a selected video service provider from the plurality of video service providers and selected video content from the selected service provider responsive to the menu selection and the search request;
determining, by the processing system, whether the media processor can perform the video session based on a decoding capability of the media processor;
responsive to a determination, by the processing system, that the media processor cannot perform the video session:
instantiating, by the processing system, a virtual server; and
instantiating, by the processing system, a virtual media player on the virtual server, wherein the virtual media player loads a decryption algorithm for the video session;
receiving, by the processing system, the selected video content from the selected video service provider, wherein the virtual media player applies the decryption algorithm to the selected video content to generate decoded video content; and
providing, by the processing system, the decoded video content to the media processor.

2. The method of claim 1, wherein the search interface further comprises search menus gathered from the equipment of the plurality of video service providers.

3. The method of claim 1, wherein the media processor presents the decoded video content through a single application in communication with the processing system.

4. The method of claim 1, further comprising selecting, by the processing system, the selected video service provider based on a user's historical preferences.

5. The method of claim 1, further comprising:
accessing searchable content for the plurality of video service providers;
performing a search through the searchable content according to the search request responsive to receiving the search request; and
providing results from the search through the search interface.

6. The method of claim 5, wherein the providing the decoded video content comprises presenting an interface for the decoded video content and the search interface.

7. A media processor, comprising:
a processing system including a processor; and
a memory that stores executable instructions that, when executed by the processing system, facilitate performance of operations, comprising:
receiving a request for a video session through a selected video-application;
determining whether the media processor can perform the video session based on a decoding capability of the media processor;
providing a request to a server remote from the media processor responsive to a determination that the media processor cannot perform the video on demand session, wherein the server retrieves from the media processor a password and account information associated with an account for the media processor, wherein the server instantiates a virtual media player on a virtual server, wherein the virtual media player loads a decryption algorithm for the video session, wherein the server receives video data from a video service associated with the selected video-application, and wherein the virtual media player applies the decryption algorithm on the video data to generate decoded video content;

receiving, from the server, search features gathered from equipment of a plurality of video service providers, and producing a search interface from the search features;

receiving a search request via the search interface;

providing the search request to the server;

receiving the decoded video content from the virtual media player; and providing the decoded video content to a display device for display.

8. The media processor of claim 7, wherein the operations further comprise receiving, from the server, search menus gathered from the equipment of the plurality of video service providers, and wherein the producing the search interface comprises producing the search interface from the search menus.

9. The media processor of claim 7, wherein the providing the decoded video content comprises presenting the decoded video content through a single application in communication with the server.

10. The media processor of claim 9, wherein the single application presents access options for the plurality of video service providers.

11. The media processor of claim 10, wherein the operations further comprise storing a password and account information associated with a plurality of accounts associated with plurality of video service providers.

12. The media processor of claim 7, wherein the operations further comprise:

receiving search results from the search from the server.

13. The media processor of claim 12, wherein the operations further comprise providing the search results through the search interface.

14. A non-transitory, machine-readable storage medium, comprising executable instructions that, when executed by a processing system of a server, the processing system including a processor, facilitate performance of operations, comprising:

receiving, from a media processor remote from the server, a request for a video session;

retrieving a password and account information associated with an account for the media processor;

determining whether the media processor can perform the video session based on a decoding capability of the media processor;

responsive to a determination that the media processor cannot perform the video session:

instantiating a virtual server; and instantiating a virtual media player on the virtual server, wherein the virtual media player loads a decryption algorithm for the video session;

gathering, by the processing system, search features from equipment of a plurality of video service providers, and providing the search features to the media processor;

receiving a search request via a search interface presented by the media processor, wherein the search interface comprises the search features from the equipment of the plurality of video service providers;

receiving video data from a video service associated a selected video service provider responsive to the receiving of the search request, wherein the virtual media player applies the decryption algorithm to the video data to generate decoded video content; and providing the decoded video content to the media processor.

15. The non-transitory, machine-readable storage medium of claim 14, wherein the search interface further comprises search menus gathered from the equipment of the plurality of video service providers.

16. The non-transitory, machine-readable storage medium of claim 14, wherein the operations further comprise instructing the media processor to present the decoded video content through a single application in communication with the processing system.

17. The non-transitory, machine-readable storage medium of claim 16, wherein the single application presents access options for the plurality of video service providers.

18. The non-transitory, machine-readable storage medium of claim 14, wherein the operations further comprise:

accessing searchable content for the plurality of video service providers;

performing a search through the searchable content according to the search request responsive to receiving the search request; and providing results from the search through the search interface for the decoded video content and the search interface.

19. The non-transitory, machine-readable storage medium of claim 14, wherein the media processor comprises a set-top box.

20. The non-transitory, machine-readable storage medium of claim 14, wherein the media processor comprises a wireless communication device.

* * * * *